United States Patent [19]

Eckman

[11] Patent Number: 5,149,232
[45] Date of Patent: Sep. 22, 1992

[54] MECHANICAL PECK DRILL

[75] Inventor: Richard E. Eckman, Houston, Tex.

[73] Assignee: Dresser Industries, Inc., Dallas, Tex.

[21] Appl. No.: 757,445

[22] Filed: Sep. 10, 1991

Related U.S. Application Data

[62] Division of Ser. No. 374,306, Jun. 30, 1989, Pat. No. 5,062,745.

[51] Int. Cl.$^5$ .............................................. B23B 47/18
[52] U.S. Cl. ........................................ 408/137; 408/17; 408/138
[58] Field of Search ............... 408/1 R, 17, 137, 138, 408/141

[56] References Cited

U.S. PATENT DOCUMENTS

| | | | |
|---|---|---|---|
| 3,512,433 | 5/1970 | Juhasz et al. | 408/138 |
| 3,512,434 | 5/1970 | Juhasz et al. | 408/137 |
| 3,574,290 | 4/1971 | Eckman | 408/9 |
| 3,583,822 | 6/1971 | Alexander et al. | 408/137 |
| 3,767,313 | 10/1973 | Bohoroquez et al. | 408/137 |
| 3,803,927 | 4/1974 | Lawler | 408/138 |
| 3,955,629 | 5/1976 | Turner | 408/137 |
| 4,538,942 | 9/1985 | Vindez | 408/137 |
| 4,591,299 | 5/1985 | Eckman | 408/1 R |
| 4,592,681 | 6/1986 | Pennison et al. | 408/10 |
| 4,681,490 | 7/1987 | Pennison et al. | 408/137 |
| 4,688,970 | 8/1987 | Eckman | 408/9 |
| 5,062,745 | 11/1991 | Eckman | 408/17 |

Primary Examiner—Daniel W. Howell
Attorney, Agent, or Firm—Richards, Medlock & Andrews

[57] ABSTRACT

A mechanical pecking method and device is provided wherein a spindle adapted to hold a tool such as a drill bit is mechanically reciprocated in a workpiece. Also provided is a control system and method for controlling the mechanical reciprocation of the spindle and a sensor for remembering the last point of advancement of the spindle during each peck cycle.

25 Claims, 13 Drawing Sheets

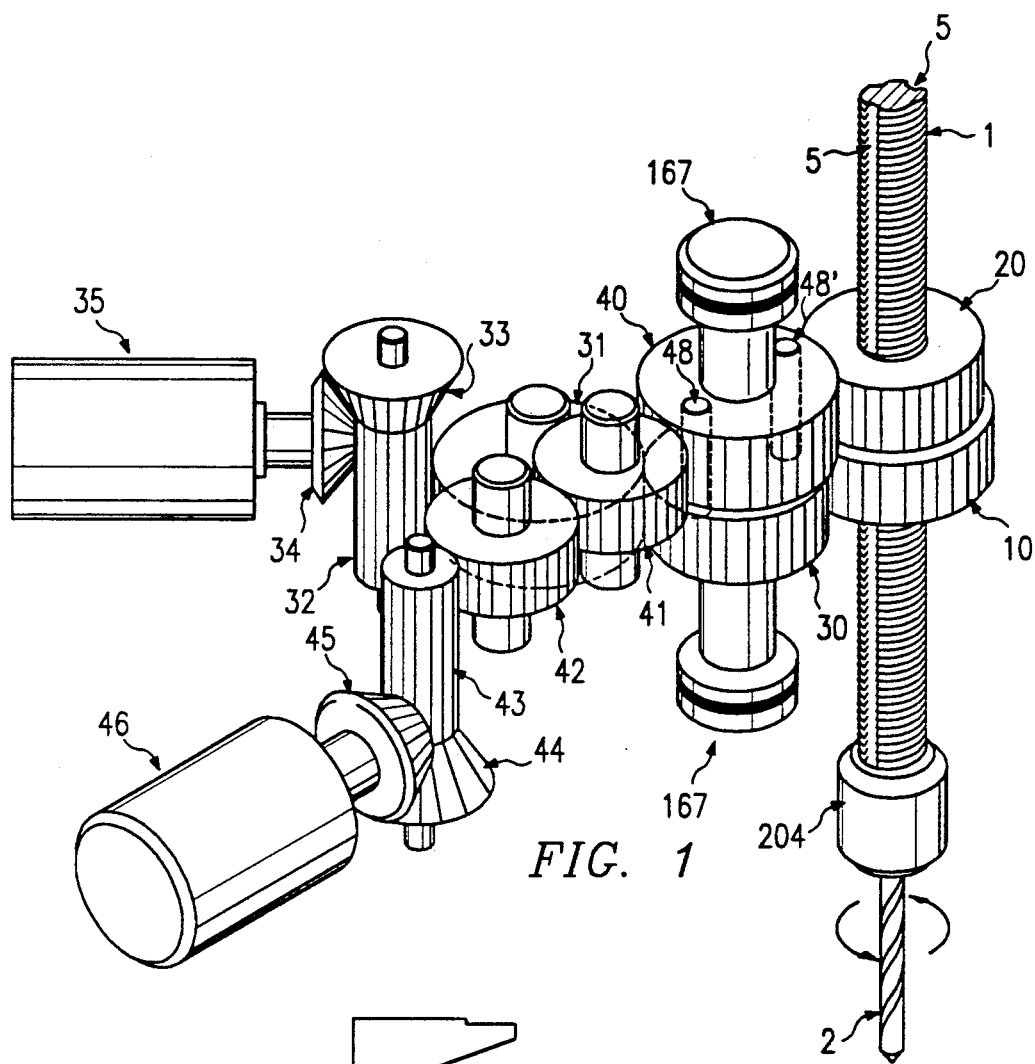
FIG. 1
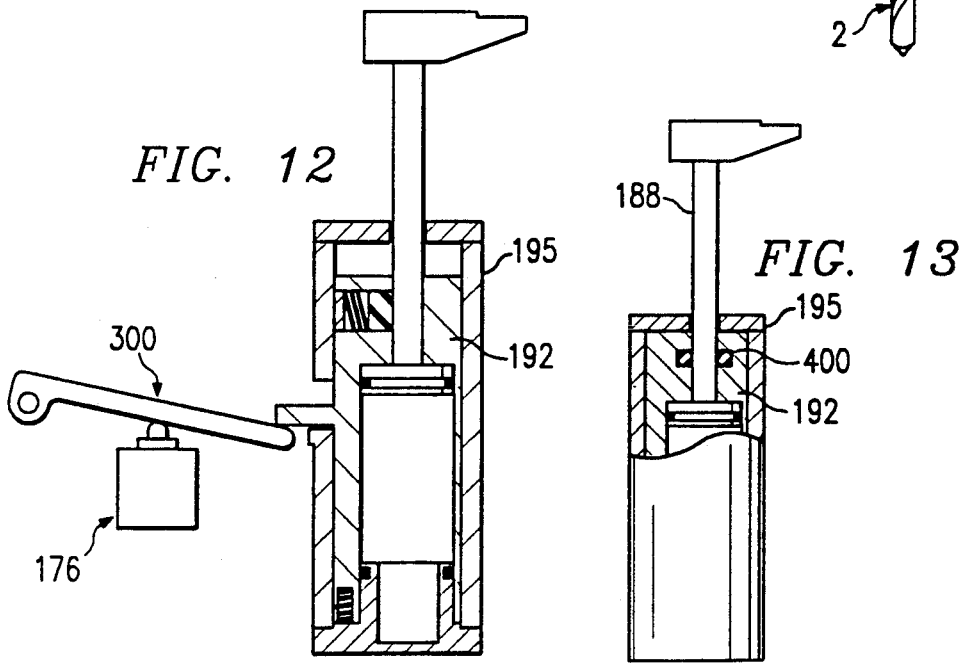
FIG. 12
FIG. 13

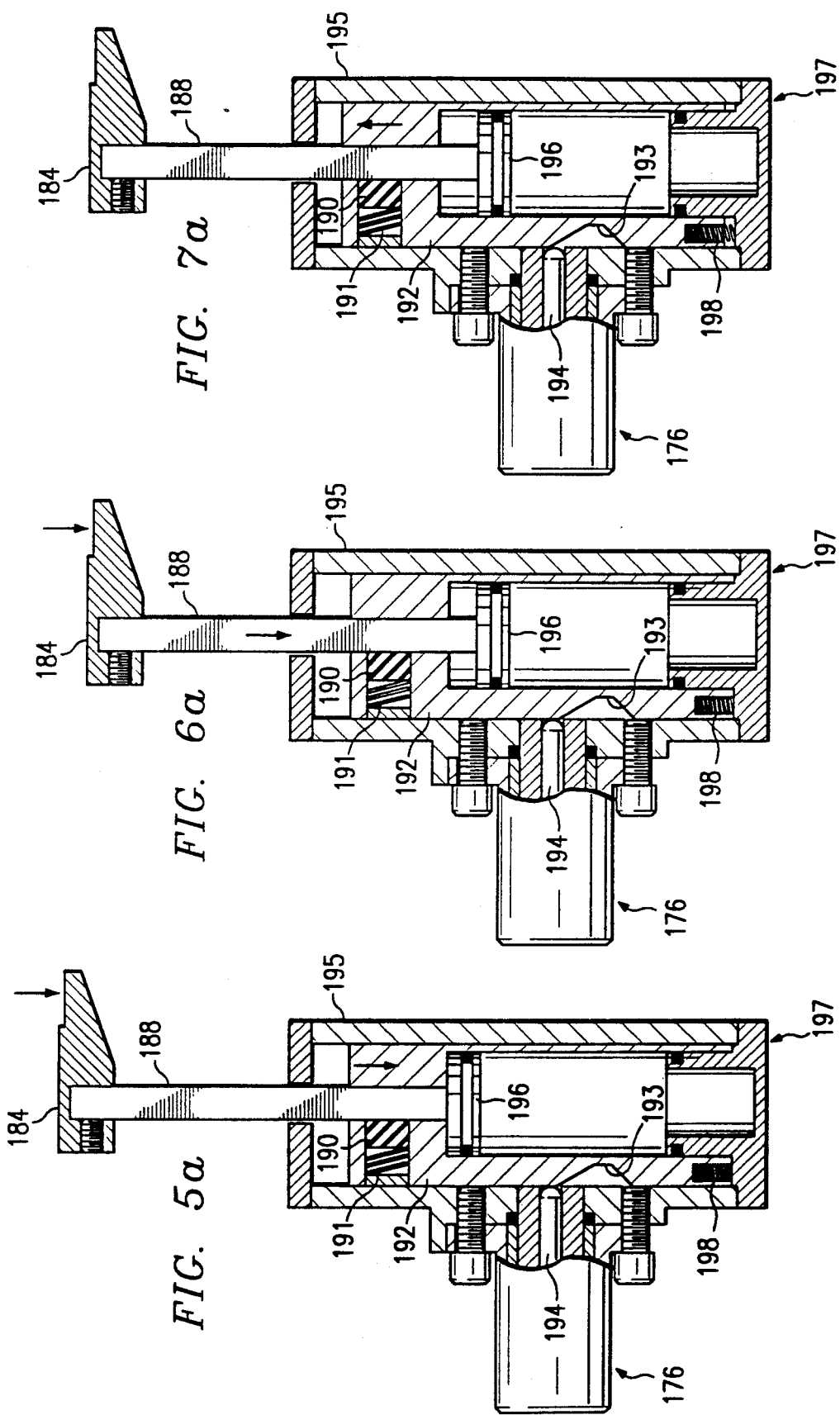

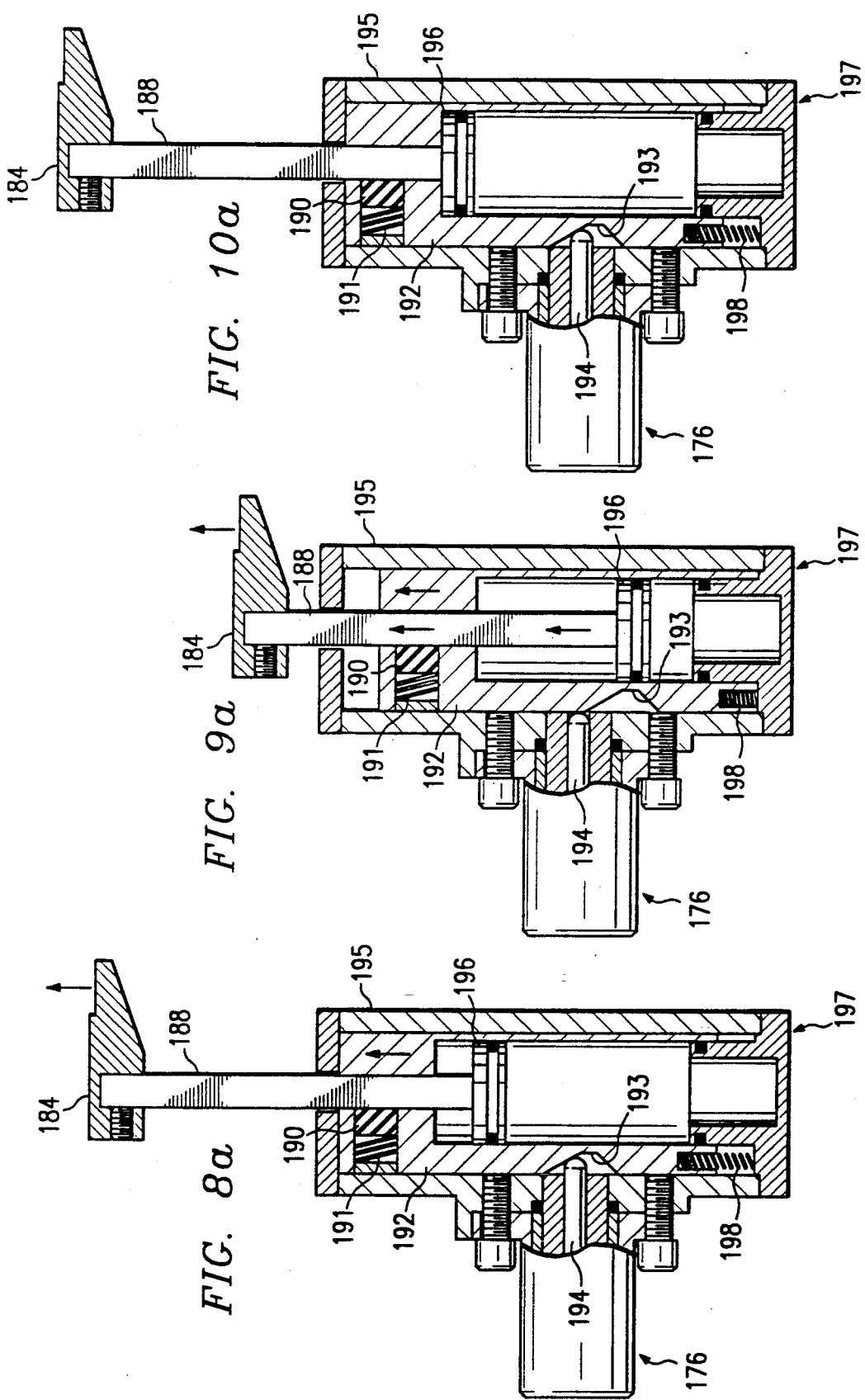

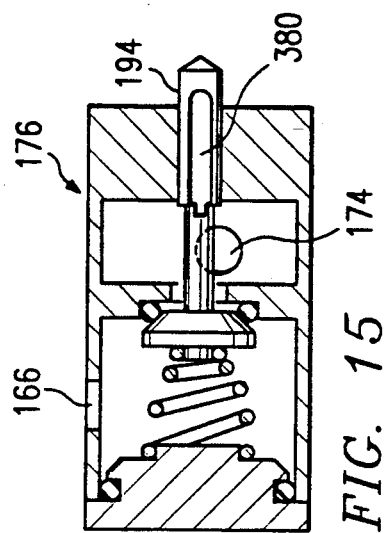
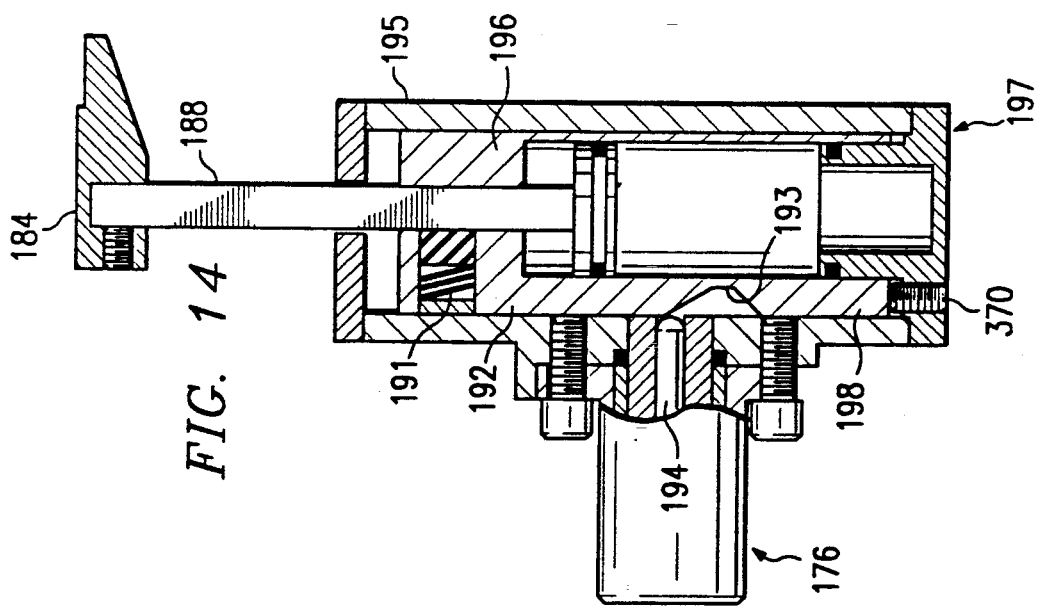

MECHANICAL PECK DRILL

This is a division of application Ser. No. 07/374,306, filed Jun. 30, 1989, now U.S. Pat. No. 5,062,745, issued on Nov. 5, 1991.

FIELD OF THE INVENTION

This invention relates to drills for automatically drilling holes in a workpiece with a drill bit. In one aspect the invention relates to gearing for advancing and retracting the drill bit. In another aspect the invention relates to a control system for controlling the advancement and retraction of the drill bit In yet another aspect the invention relates to a memory for retaining the position of the drill bit just before the drill bit is withdrawn from the hole during retraction so that the bit may later be advanced rapidly toward the end of the hole and then advanced slowly to the workpiece upon reaching that remembered position.

BACKGROUND OF THE INVENTION

The particular drilling process used may be referred to as "pecking" wherein the drill bit cuts a hole partway into the workpiece, withdraws out of cutting contact with the bottom of the hole and preferably completely clear of the hole (thus clearing cuttings and cooling the bit), and then advances to the bottom of the hole again to resume cutting.

The pecking cycle includes the steps of:

(1) rapidly advancing the drill bit to a position near the workpiece;

(2) upon reaching a position near the workpiece, changing the advance speed of the drill bit to an appropriate speed for drilling;

(3) drilling a hole in the workpiece to a portion of the desired depth for the hole;

(4) retracting the drill bit from the bottom of the hole after an amount of drilling (in a preferred embodiment, after a predetermined time) to a second predetermined position (in a preferred embodiment, just clear of the workpiece);

(5) advancing the drill bit toward the bottom of the hole;

(6) upon reaching a position near the bottom of the hole, changing the advance speed of the drill bit to an appropriate speed for drilling;

(7) repeating steps (3) through (6) until the desired depth of the hole is achieved; and (8) retracting the drill bit to clear the workpiece.

Pecking is the preferred method to drill a hole to help remove the cuttings which congregate in the flutes of the drill bit, and it is very useful in the drilling of composite materials such as those found in the aircraft industry. When drilling through the materials normally used in those composites, a cooling liquid applied to the drill bit can make an undesirable mud when it combines with the cuttings. A pecking drill can drill without liquid coolant, because the bit cools upon the frequent withdrawals from the workpiece. Also, when drilling from a soft layer into a hard layer of laminated materials, the hard cuttings mar the hole formed in the softer material if they are not removed. Pecking removes those hard cuttings faster than non-pecking drilling methods.

Originally, the pecking method was done manually with a drill press or portable hand drill. Later, automatic peck drills were made using air cylinders to advance and retract the bit, usually by advancing and retracting the entire drill, including the motor used to turn the spindle. This resulted in large and unwieldy drills.

In the pneumatic pecking drills, a hydraulic hydrocheck restrains the air cylinder that is stroking the bit into the workpiece. An adjustable by-pass or restriction controls the rate of advancement toward the workpiece. Changing the by-pass controls the rate of advancement of the drill bit, and it opens to permit rapid retraction when removing the bit from the hole.

Pneumatic peck drills are unsatisfactory when the feed rate must be accurately controlled, because the air cylinder produces a surge when the bit passes through the opposite face of the material being drilled or from a hard region to a softer one in a laminated structure. This surge increases the amount that cuttings from the hard region intrude into the soft region, and it produces a burr on the back side of the workpiece when breaking through.

SUMMARY OF THE INVENTION

According to a first embodiment of the invention, there is provided an apparatus for working workpiece with a tool a mechanical reciprocator which is connected to the tool and advances and retracts the tool (herein, "mechanical reciprocator" should be interpreted to exclude the use of air cylinders whereby changes in air pressure affect the magnitude of the reciprocation motion, rather than the rate of reciprocation);

a rotator which is connected to the tool and turns the tool; and a drive train connected to the mechanical reciprocator.

Preferably this first embodiment of the invention a spindle on which the tool (such as a drill bit) is mounted;

three indicators, preferably collars, mounted on the spindle;

a spindle feed gear which is connected to the spindle and preferably threaded on the spindle;

a spindle rotation gear which contacts the spindle and is preferably slideably mounted on the spindle;

a differential rotation gear, engaging the spindle rotation gear; and a differential feed gear, engaging the spindle feed gear.

The spindle feed gear is reversible between an advance direction of rotation and a retract direction of rotation.

The differential feed gear engages the spindle feed gear and the differential rotation gear when shifted into a "drilling mode" position by a shifter (preferably, the shifter comprises a pneumatic cylinder). However, when the drill bit is not in drilling contact with the workpiece (or not very close to drilling contact with the workpiece) the differential feed gear is engaged with the spindle feed gear and disengaged from the differential rotation gear. This state of being disengaged from the differential rotation gear is a "non-drilling mode" position.

In one embodiment, a rotation drive train engages the differential rotation gear, and a feed drive train engages the differential feed gear when the differential feed gear is disengaged from the differential rotation gear. A single drive train may be defined by using one motor to power both the feed and rotation drive trains, with a transmission or other gearing or the like to cause the spindle feed gear to rotate in the appropriate speed and direction to make the spindle advance, retract, and cycle through the pecking function. Alternatively, each drive train includes its own motor. In one two-motor embodiment, the rotation drive train motor is of the single direction type, and the feed drive train motor is reversible.

Also in another embodiment of the invention, there is provided a control system for controlling a drill which includes:

a drilling mode sensor, responsive to the drill bit nearing the workpiece (the drilling mode sensor signals that the drill bit is near a position where it will be in drilling contact with the workpiece);

a timer which initiates a time period when it receives a signal from the first sensor and at the end of that time period signals that the drill bit has been drilling for a preselected time;

a retracted position sensor, responsive to the position of the drill bit when the drill bit has retracted from the bottom of the hole to a retracted position; and an end of hole sensor, responsive to the position of the drill bit when the drill bit has advanced to a predetermined position.

One embodiment of the control system also includes a "job done" sensor which generates a job done signal when both:

1) sensing the end of hole signal and
2) sensing that an indicator on the spindle has reached a predetermined position.

The job done signal can be utilized to stop the feed and rotation drive trains.

In one embodiment, the drilling mode sensor comprises a spindle position memory. A preferred spindle position memory includes:
a sleeve;
a piston reciprocably mounted in the sleeve;
a shaft connected to the piston and extending through the sleeve;
a shaft holder contacting the shaft to retain the shaft; and
an actuator to move the shaft against the restraint of the shaft holder when the spindle moves to a deeper cutting depth.

Another embodiment of the spindle position memory also includes:
a housing in which the sleeve is reciprocably mounted;
a resilient member, preferably a spring, biasing the sleeve toward a first end of the housing;
a switch;
a detent in the sleeve; and
a plunger which actuates the switch responsive to the engagement of the plunger and the detent, The switch changes to one state when the plunger moves toward the switch and changes to another state when the plunger moves away from the switch.

In yet another embodiment of the invention, a spindle position indicator can be mounted on the spindle, such that the spindle position indicator advances and retracts in the same manner as does the drill bit. The spindle position memory can be located such that as the spindle position indicator travels toward the workpiece, the indicator contacts the shaft of the piston or an arm mounted on the shaft, forcing the piston to move relative to the sleeve and forcing air or fluid out from the sleeve. The sleeve preferably contains at least one port for entrance and exit of air or other fluid.

The piston is in friction contact with the sleeve such that as the spindle position indicator forces the piston to move relative to the sleeve, the sleeve is moved against the force of the spring. The sleeve compresses the spring and travels in the housing until the spring is fully compressed. As the detent in the sleeve moves away from the plunger, the plunger moves into the switch, thus generating a signal.

When the spindle is retracted, the spindle position indicator rises from contact with the arm on the piston shaft, and the piston shaft is then held in place by a holder.

Upon the upward movement of spindle, the spring biasing the sleeve forces the sleeve to move back to the position in the housing at which the sleeve was located before the indicator first activated the piston shaft. At that point, the detent and the plunger again align, the plunger moves into the detent, and the switch changes state.

The detent does not force the plunger into the switch (thereby changing its state once again) until the spindle is again moved toward the workpiece so that the spindle position indicator activates the piston shaft again. However, the piston shaft does not return to its original position when the spindle position indicator retracts; it remains about where it was when the drill bit was at the bottom of the hole.

Thus, by monitoring the change of state in the switch, the spindle can be rapidly advanced into the hole until the spindle position indicator contacts the arm on the piston shaft. At that point, the drill bit will be close to the current bottom of the hole. The control system uses the drilling mode signal generated from the switch to slow the rate of advancement of the spindle to a speed appropriate for drilling.

BRIEF DESCRIPTION DRAWINGS

FIG. 1 is a perspective view of the reciprocator, rotator and dr of a preferred embodiment of the invention.

FIG. 5A is a sectional view of the positioning of the position memory the preferred embodiment during the initial advancement toward the workpiece.

FIG. 6A sectional view of the positioning of the position memory of the preferred embodiment during the "drilling mode".

Figure 7:
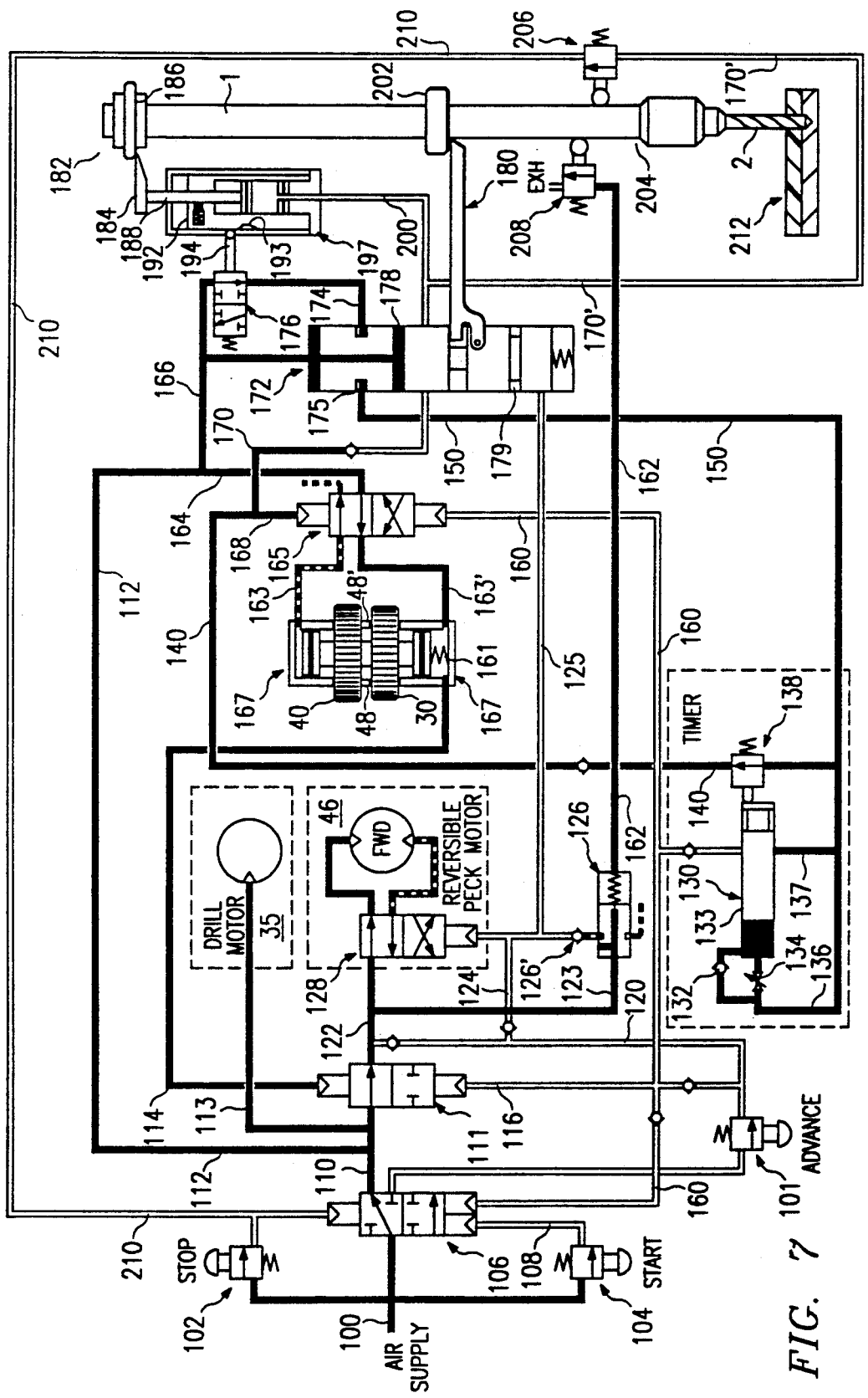

FIG. 7 is a pneumatic circuit schematic showing the state of the preferred control system after the timer has finished timing retraction of the spindle has begun.

FIG. 7A is a sectional view of the positioning of the position memory the preferred embodiment during retraction of the spindle after the timer has finished timing.

Figure 8:
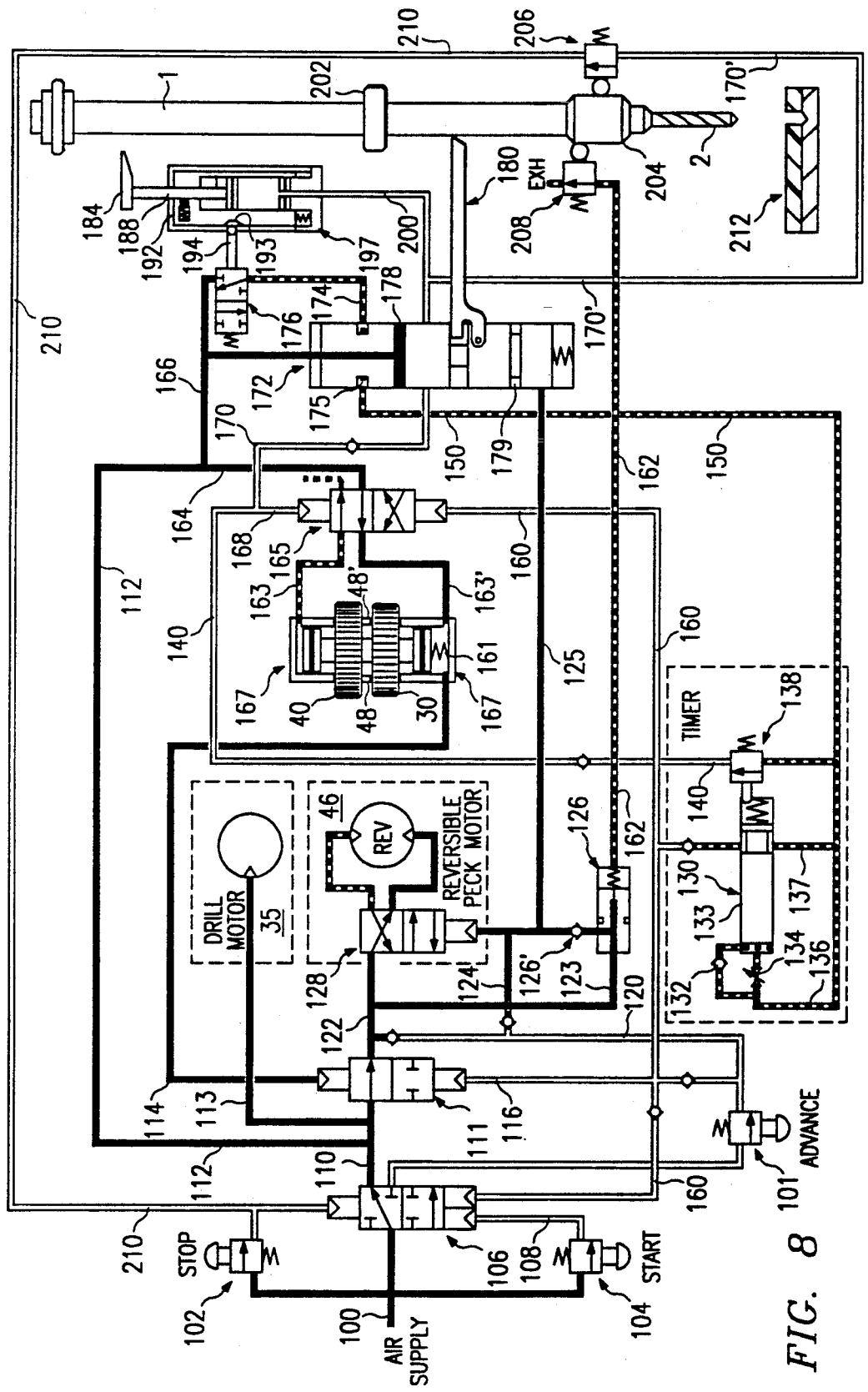

FIG. 8 is a pneumatic circuit schematic showing the state of the preferred control system after the spindle has retracted; but before the end of the hole is reached.

FIG. 8A is a sectional view of the position memory of the preferred embodiment after the spindle has retracted, but before the end hole is reached.

Figure 9:
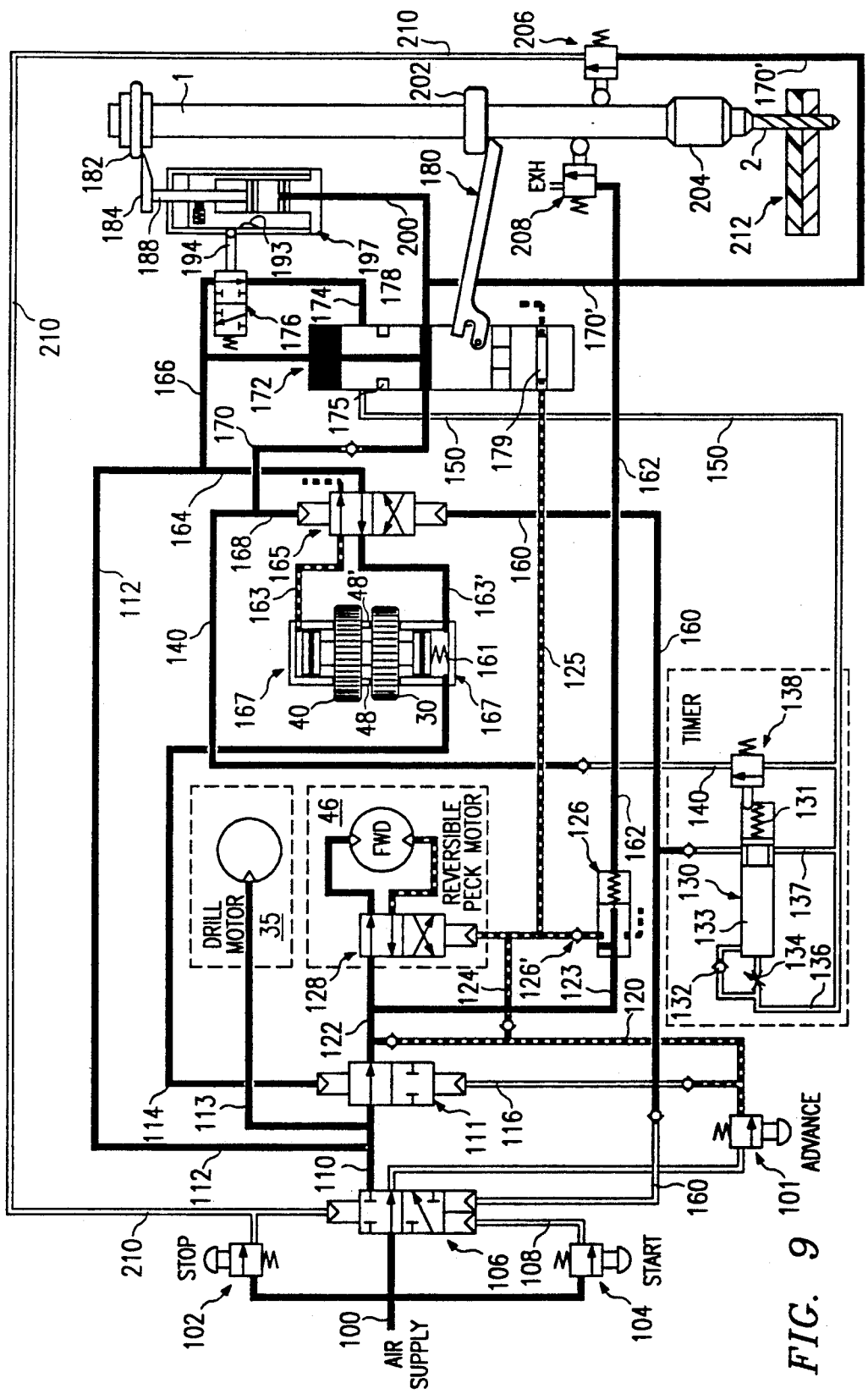

FIG. 9 is a pneumatic circuit schematic showing the state of the preferred control system after the end of the hole has been reached.

FIG. 9A is a sectional view of the position memory of the preferred embodiment after the end of the hole has been reached.

Figure 10:
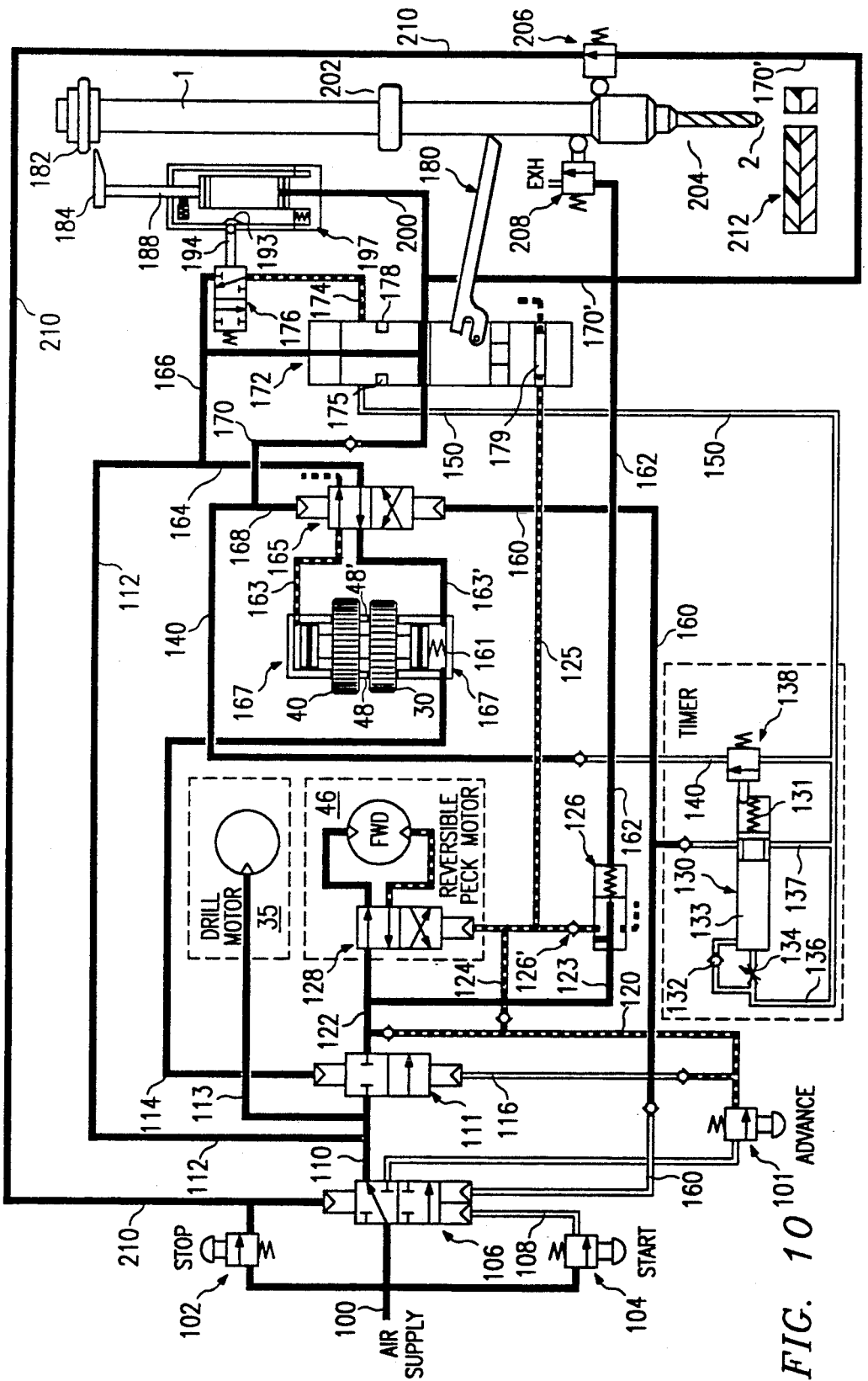

FIG. 10 is a pneumatic circuit schematic showing the state of the control system during retraction of the spindle after the end of the hole has been reached.

FIG. 10 sectional view of the position memory of the preferred during retraction of the spindle after the end has been reached.

Figure 11:
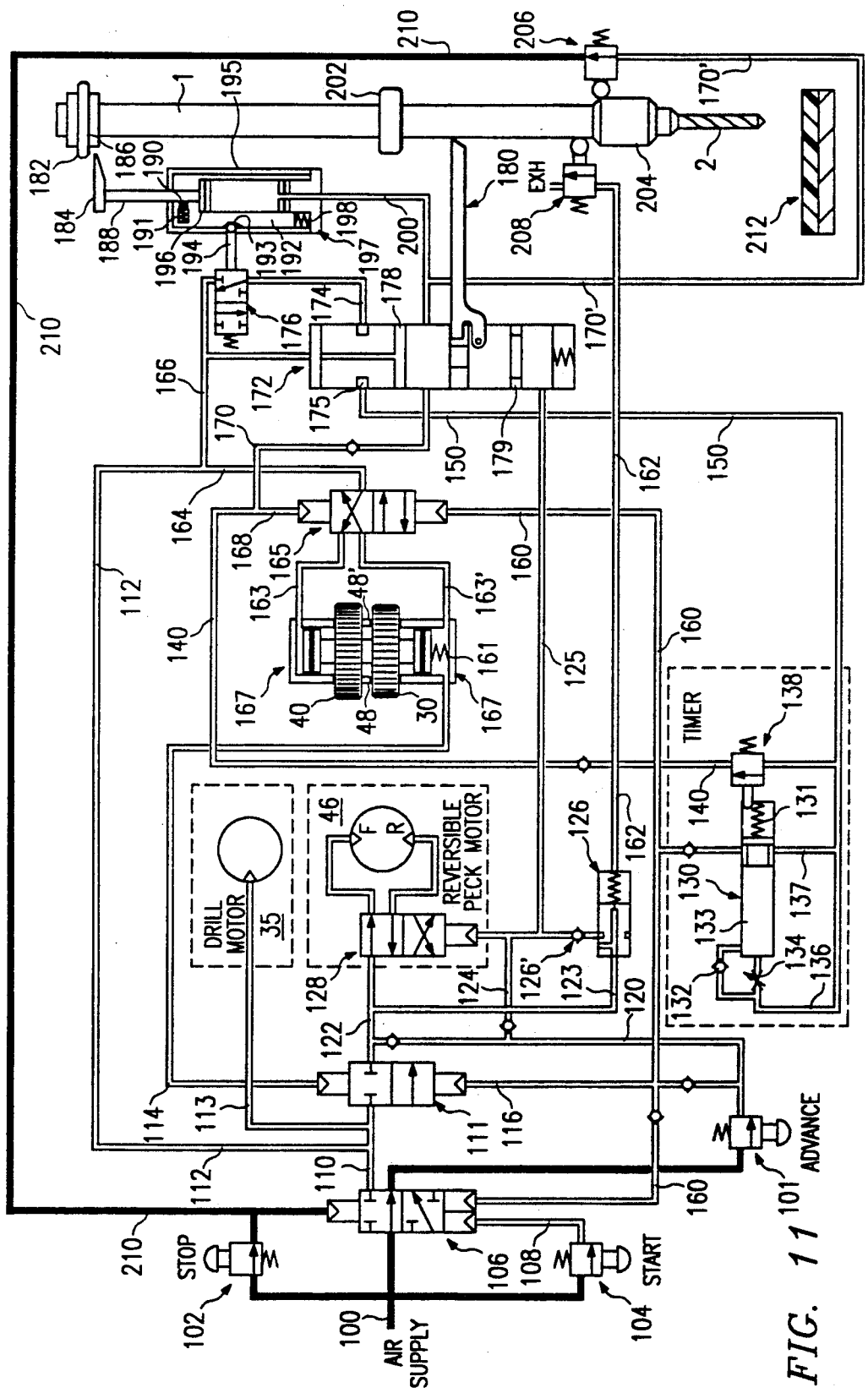

FIG. 11 is a pneumatic circuit schematic showing the state of the control system after the stop button is depressed.

FIG. 12 is a sectional view of an alternative embodiment of the position memory.

FIG. 13 is a sectional view of another alternative embodiment of the position memory.

FIG. 14 is a sectional view of the set screw used in a preferred embodiment of the position memory;

FIG. 15 is a sectional view of bleed slot in the position memory switch.

DETAILED DESCRIPTION

A preferred embodiment of the invention comprises a reciprocator, rotator, and a drive train as shown in FIG. 1. In this embodiment, there is provided a spindle 1 which. is adapted to have a drill bit 2 mounted coaxially on its lower end.

The rotator in this embodiment comprises a spindle rotation gear 10 which is keyed to grooves 5 in spindle 1 whereby spindle 1 may be reciprocated along its common axis with rotation gear 10 while being rotated about that common axis by rotation gear 10.

The reciprocator in this embodiment comprises spindle feed gear 20 which is threaded to spindle 1 and resides above rotation gear 10 as shown in FIG. 1.

The drive train in this embodiment comprises two drive trains: a feed drive train having air motor 46 and gears 40-45; and a rotation drive train having air motor 35 and gears 30-34.

Spindle rotation gear 10 rotates spindle 1 in a clockwise direction (as seen from above in FIG. 1. Thus, if spindle feed gear 20 rotates at the same rotational speed as spindle rotation gear 10, then spindle 1 will not advance or retract through spindle rotation gear 10 (advancement refers to the spindle moving in a "downward" direction toward the workpiece, and retraction refers to the spindle moving in an "upward" direction, relative to spindle rotation gear 10, and away from the workpiece).

With a clockwise rotational direction and left-hand threads on spindle 1, spindle feed gear 20 must rotate faster than spindle rotation gear 10 for spindle 1 to advance. When spindle feed gear 20 rotates at any speed slower than the rotational speed of spindle rotation gear 10, spindle 1 will retract. The greater the differential rotational speed between spindle rotation gear 10 and spindle feed gear 20, the faster the advancement or retraction of spindle 1 will be. If spindle feed gear 20 is stopped, or if it is reversed in its rotational direction, spindle 1 will retract at a greater speed than if spindle feed gear 20 is rotating in the same direction as spindle rotation gear 10.

In this preferred embodiment, the feed drive train which turns spindle feed gear 20 comprises a differential feed gear 40 which is connected to an air motor 46 through gears 41, 42, 43, 44, and 45 as shown in FIG. 1. Air motor 46 is of a reversible type and thus drives spindle feed gear 20 either in the same rotational direction as spindle rotation gear 10, or in the reverse rotational direction to that of spindle rotation gear 10.

This preferred embodiment also includes differential rotation gear 30 which is meshed to spindle rotation gear 10. Differential rotation gear 30 is driven by air motor 35 (a single direction motor) through gears 31, 32, 33, and 34. Spindle rotation gear 10 is always connected through gears 30, 31, 32, 33, and 34 to air motor 35; and spindle feed gear 20 is always connected by gears 40, 41, 42, 43, 44, 45 to air motor 46.

Differential feed gear 40 is mounted on a pneumatic cylinder 167 (the shifter in this embodiment) coaxially with differential rotation gear 30. When differential feed gear 40 is shifted to the position shown in FIG. 1, it is connected to differential rotation gear 30 by pins 48 and 48'. In this position, differential rotation gear 30 supplies rotational force to differential feed gear 40, and thus differential rotation gear 30 and differential feed gear 40 rotate at the same rotational speed.

While differential rotation gear 30 and differential feed gear 40 are connected together through pins 48 and 48', air motor 46 is turned off, and no force is applied by air motor 46 through gears 41-45; thus, gears 41-45 and air motor 46 are also rotated by differential rotation gear 30 when differential feed gear 40 is engaged with differential feed gear 30.

Differential feed gear 40 has a diameter which is slightly larger than that of differential rotation gear 30, and spindle feed gear 20 has a diameter which is slightly smaller than the diameter of spindle rotation gear 10. Thus, when differential rotation gear 30 and differential feed gear 40 are rotated at the same rotational direction and speed, spindle feed gear 20 will rotate in the same direction as spindle rotation gear 10, but at a faster rotational speed. Therefore, given the left hand threads of spindle 1, drill bit 2 will advance. When advancing with the gears arranged as just described, the drill may be said to be in the "drilling mode."

Figure 2:
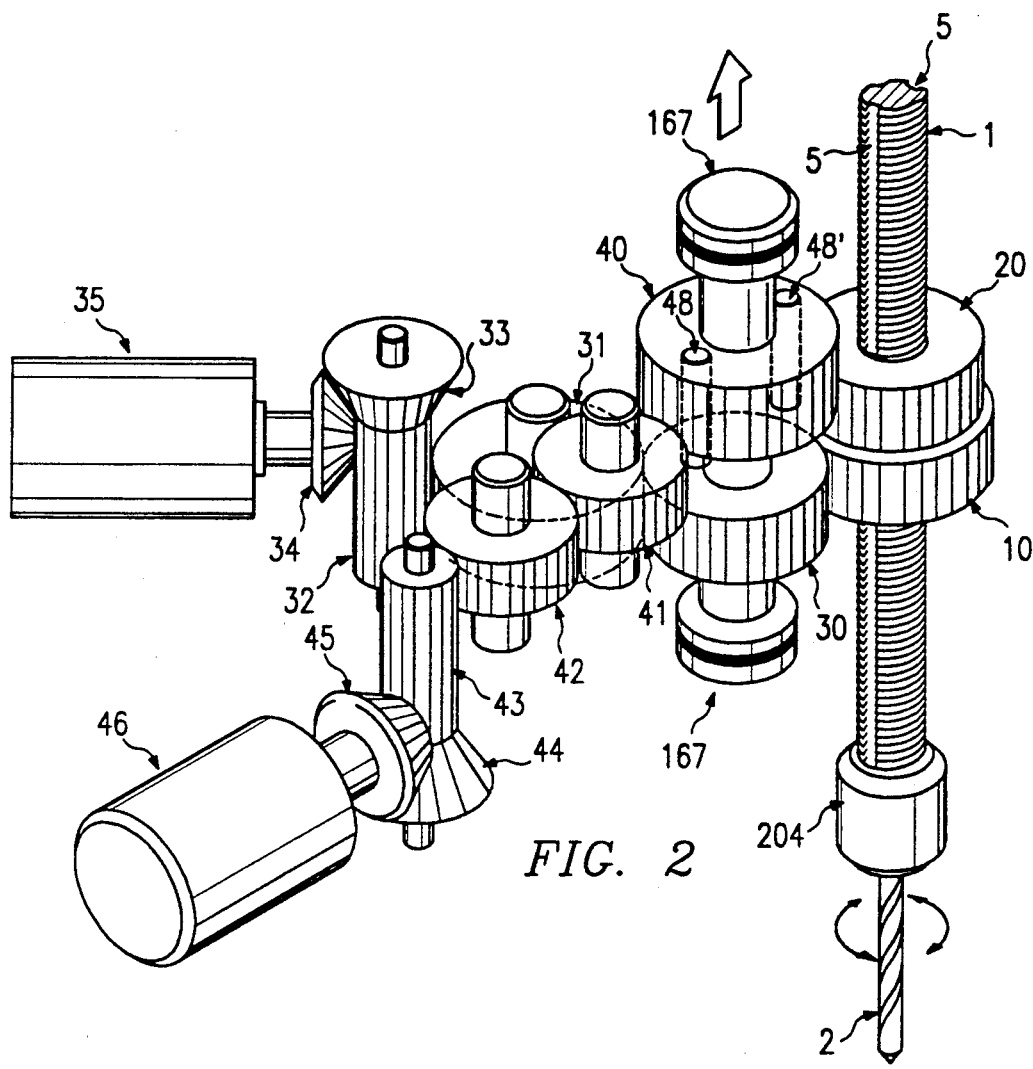
FIG. 2 is another plan view of the reciprocator, rotator and drive train of a preferred embodiment of the invention differential feed gear disengaged from a differential rotation gear.

After the drill bit has cut a hole to part of its desired depth, it is desired to remove the drill bit from the hole. Such retraction is achieved in this preferred embodiment by using pneumatic cylinder 167 to shift differential feed gear 40 (and therefore pins 48 and 48') upwardly so that pins 48 and 48' are no longer engaged with differential rotation gear 30. This gear position is best seen in FIG. 2. When differential feed gear 40 is shifted such that it is disengaged from differential rotation gear 30, it is still engaged with spindle feed gear 20; and differential rotation gear 30 is still engaged with spindle rotation gear 10.

In this preferred embodiment, air motor 46 runs in a direction (here defined as the "forward direction") such that gears 41-45 turn differential feed gear 40 in the opposite direction from the rotational direction of differential rotation gear 30. Therefore, spindle feed gear 20 is turned in the direction opposite from the rotational direction of spindle rotation gear 10, and therefore spindle 1 retracts.

After spindle 1 has withdrawn from the end of the hole (preferably withdrawn completely from the hole) air motor 46 reverses its direction. Through gears 40–45, air motor 46 turns differential feed gear 40 in the same rotational direction as that of differential rotation gear 30. The speed of air motor 46 in the reverse direction is at least fast enough such that differential feed gear 40 turns as fast as differential rotation gear 30 (thus rotating spindle feed gear 20 in the same direction, but faster than, spindle rotation gear 10 because of the difference in gear diameter), but preferably, the speed of air motor 46 in the reverse direction is fast enough to cause differential feed gear 40 to rotate faster than differential rotation gear 30, thereby causing spindle 1 to advance rapidly toward the workpiece.

When the drill bit is about to contact the current bottom of the hole, air motor 46 is turned off, differential feed gear 40 is shifted by pneumatic cylinder 167 downward toward differential rotation gear 30, and pins 48 and 48' engage differential rotation gear 30 with differential feed gear 40. Thus, once again, the drill is in the "drilling mode".

After again drilling for some amount of time, differential feed gear 40 will again be shifted by cylinder 167 to disengage pins 48 and 48' from differential rotation gear 30, and air motor 46 will be turned on to retract spindle 1 from the hole. After retraction to the desired position is complete, air motor 46 will again reverse, and spindle 1 will advance toward the workpiece. Upon drill bit 2 nearing the workpiece, differential feed gear 40 (and pins 48 and 48') will be shifted by pneumatic cylinder 167 to engage differential rotation gear 30. Air motor 46 will be turned off, thus repeating the peck cycle.

In this preferred embodiment, the pecking cycle will be repeated until a drill bit position corresponding to the desired hole depth is reached. Upon reaching that predetermined position, pneumatic cylinder 167 will shift differential feed gear 40 (and pins 48 and 48') to disengage from differential rotation gear 30, and air motor 46 will turn on to retract spindle 1 completely from the workpiece to a "job done" position. Upon the full retraction in this last cycle, air motor 35 and air motor 46 can be turned off, thus stopping any motion of spindle 1.

Figure 3:
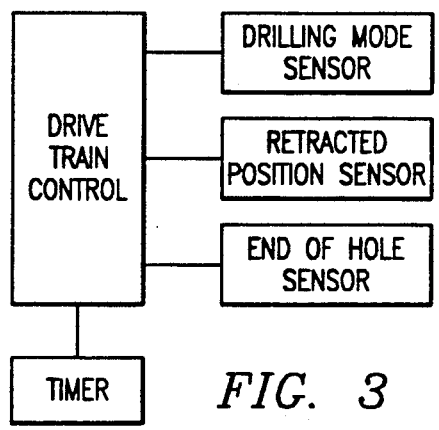
FIG. 3 is a block diagram of the control system of a preferred of the invention.

Now referring to FIG. 3, a preferred control system for control of the reciprocator, rotator, and drive train of the present invention is shown in block diagram form. It comprises a drilling mode sensor, a retracted position sensor, a timer, and end of hole sensor, and a drive train control. Preferably, the control system shown in FIG. 3 is a circuit made from pneumatic components as described below, but it may be made from other components (for example, analog electrical circuit components or digital control components).

Figure 4:
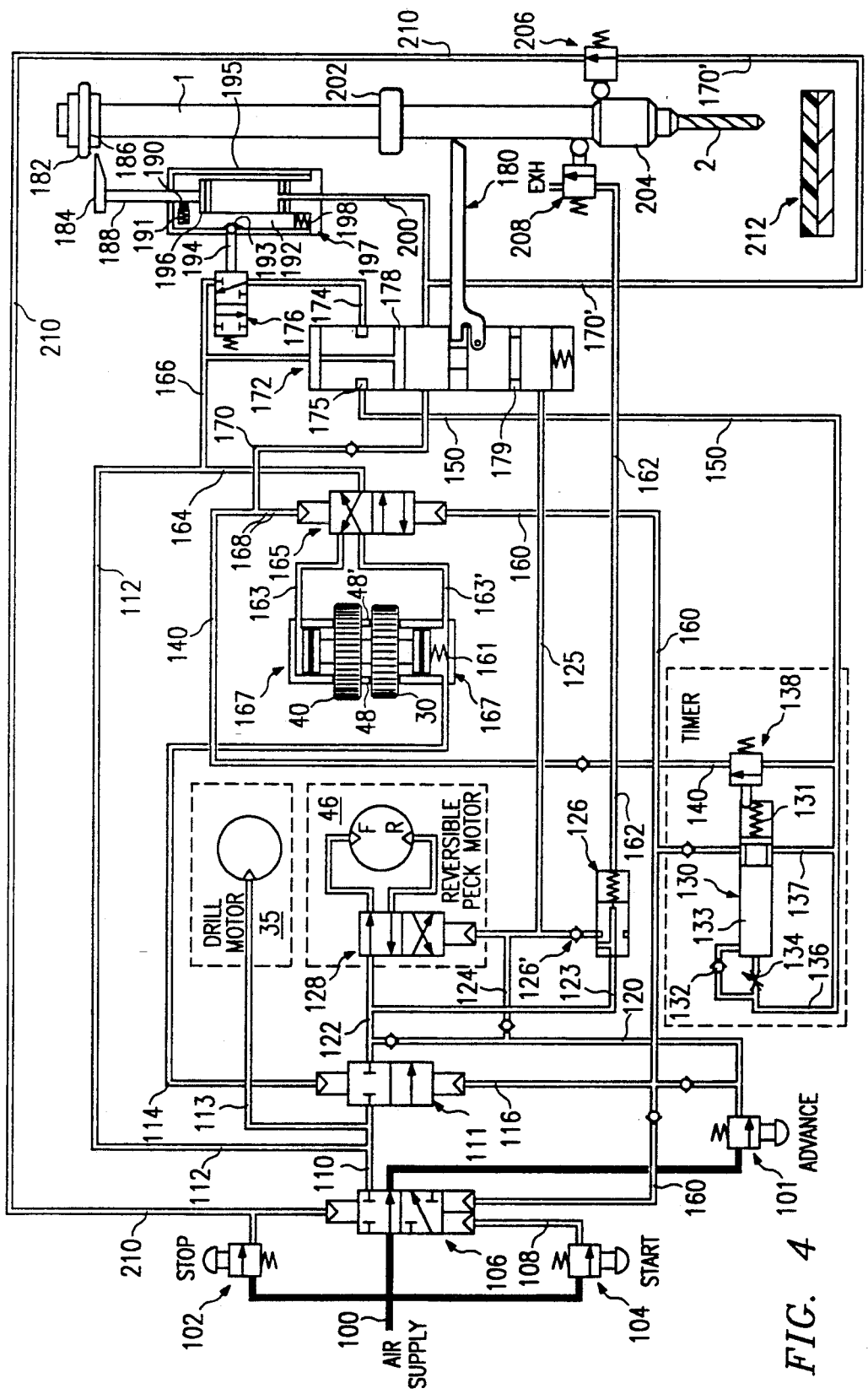
FIG. 4 is a pneumatic circuit schematic of a preferred embodiment of the control system shown in the "exhausted" state.

Now referring to FIG. 4, in this preferred embodiment, the drilling mode sensor comprises a spindle position memory including switch 176, piston 196, sleeve 192, housing 197 and piston shaft head 184.

The retracted position sensor in this embodiment comprises switch 208.

The preferred timer 130 comprises cylinder 133, check valve 132, restriction 134 and switch 138.

Also in this preferred embodiment, the "bottom of hole" sensor comprises a retract valve 172.

The drive train control in this preferred embodiment includes pneumatic cylinder 167, four-way valve 165, reversing valve 128, reversing actuating valve 126, two-way valve 111, and master valve 106.

Still referring to FIG. 4, the preferred circuit is shown in its exhausted state (i.e. when master valve 106 is positioned such that air from line 100 cannot pass directly to line 110) after workpiece 212 has been positioned for drilling under spindle 1.

It is desirable to rapidly advance spindle 1 and drill bit 2 toward workpiece 212 at a speed faster than the relatively slow drilling mode speed used when the drill bit is in contact with the workpiece. To accomplish this, manually actuatable "advance" button 101 is provided which is connected to air supply inlet 100 through master valve 106 such that advance button 101 has pressure available on one side when the circuit is exhausted as shown in FIG. 4. Pressurized lines are shown in the drawings as solid black while exhausted lines are dashed.

The lines shown are connected such that they will bleed pressure when air is not being supplied to them. This may be accomplished by loose connections, leaky lines, or preferably by drilling a hole in the valve body near the line connection.

Pressing advance button 101 allows air pressure into the lines. Pressure in line 116 biases two-way valve 111 such that line 122 is isolated from line 110. Pressure in line 120 activates air motor 46 through line 122, and pressure in line 120 supplies pressure to line 124 causing air motor 46 to be run in the reverse direction by shifting reversing valve 128 to the reverse position.

Pressure in line 160 biases four-way valve 165 to allow exhaust of pneumatic cylinder 167 through line 163 so that spring 161 biases pneumatic cylinder 167 to disengage differential feed gear 40 from differential rotation gear 30. Thus, the air motor 46 turns spindle feed gear 20 (through the gearing shown in FIG. 1) in the advance direction.

In this state, drill bit 2 is advanced toward the workpiece without being rotated, because air motor 35 is not turned on, and thus spindle rotation gear 10 is not turning. Advance button 101 is sized so that a low volume of air powers air motor 46. Therefore, if drill bit 2 were to contact the workpiece 212 in this condition, air motor 46 would stall and neither workpiece 212 nor drill bit 2 would be damaged.

Figure 5:
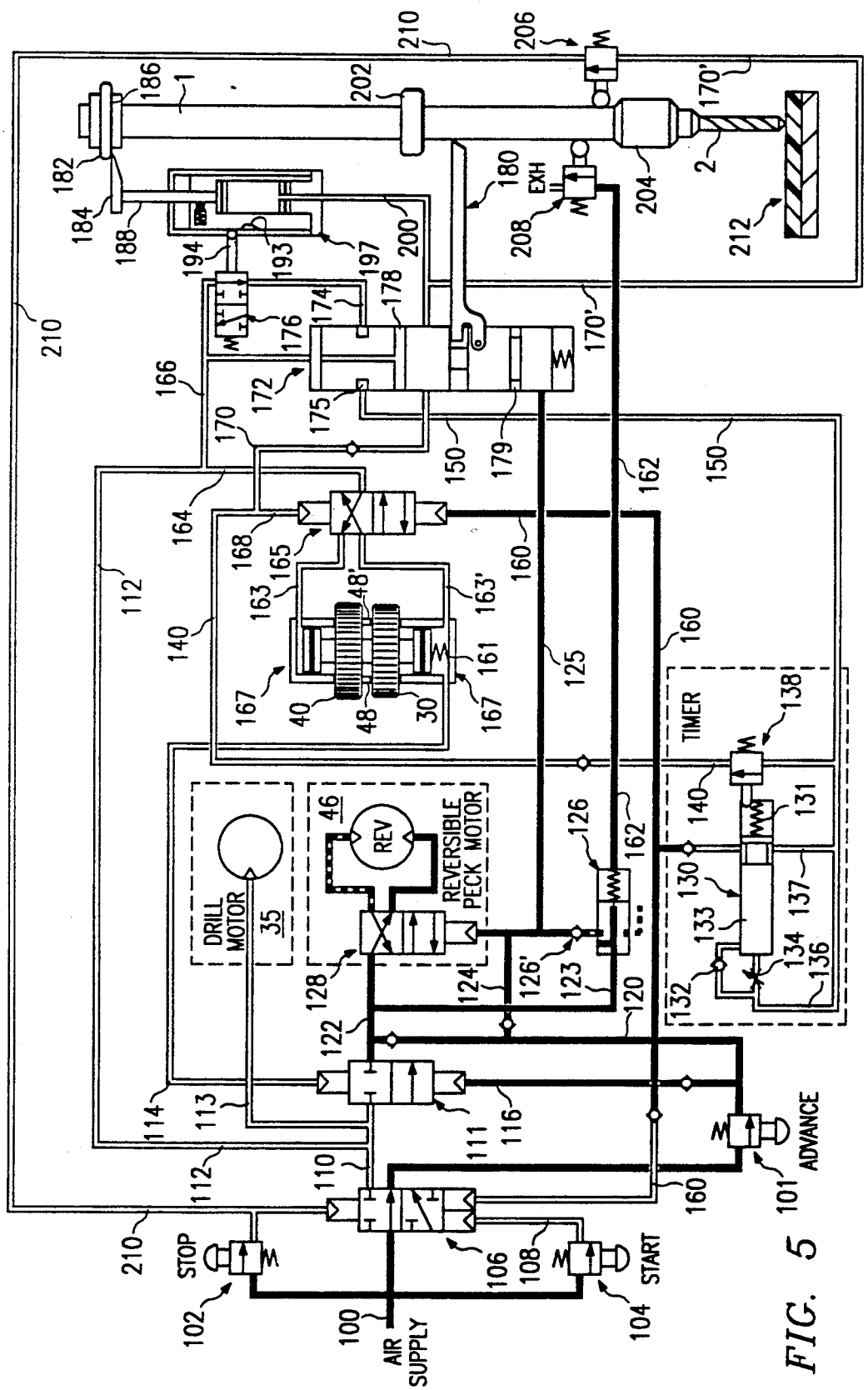
FIG. 5 is a pneumatic circuit schematic showing the state of the control system during initial advancement of to a workpiece.

Comparison of FIG. 4 and FIG. 5 shows that as the spindle 1 is advanced toward the workpiece, an indicator mounted to spindle 1 (collar 182 in this preferred embodiment) actuates piston shaft 188 by contacting arm 184 with the lower surface 186 of collar 182 as spindle 1 advances toward the workpiece.

As collar 182 travels past the point at which surfaces 184 and 186 made contact, piston head 196 is pushed along sleeve 192 (FIGS. 5A and 6A). Friction contact between piston head 196 and sleeve 192 causes sleeve 192 to travel in housing 197, thereby compressing spring 198.

When spring 198 has biased sleeve 192 as shown in FIG. 4, plunger 194 of switch 176 resides in detent 193 of sleeve 192. As shown in FIGS. 5 and 5A, when sleeve 192 is pushed downwardly due to the frictional contact with piston 196, detent 193 slides below plunger 194, resulting in plunger 194 being pressed into switch 176, thus opening switch 176 whenever piston head 196 is traveling in a downward direction.

Whenever collar 182 is removed from contact with arm 184, spring 198 pushes sleeve 192 back to the original position in housing 195 shown in FIG. 7A. Piston head 196 also rises with sleeve 192 due to friction contact, but piston head 196 only rises as far as sleeve 192, and piston head 196 does not return to its original position (see FIG. 7A).

Referring again to FIG. 5, when collar 182 has contacted arm 184 and sleeve 192 is biased as shown in FIG. 5A, switch 176 is open, and drill bit 2 is contacting workpiece 212.

Figure 6:
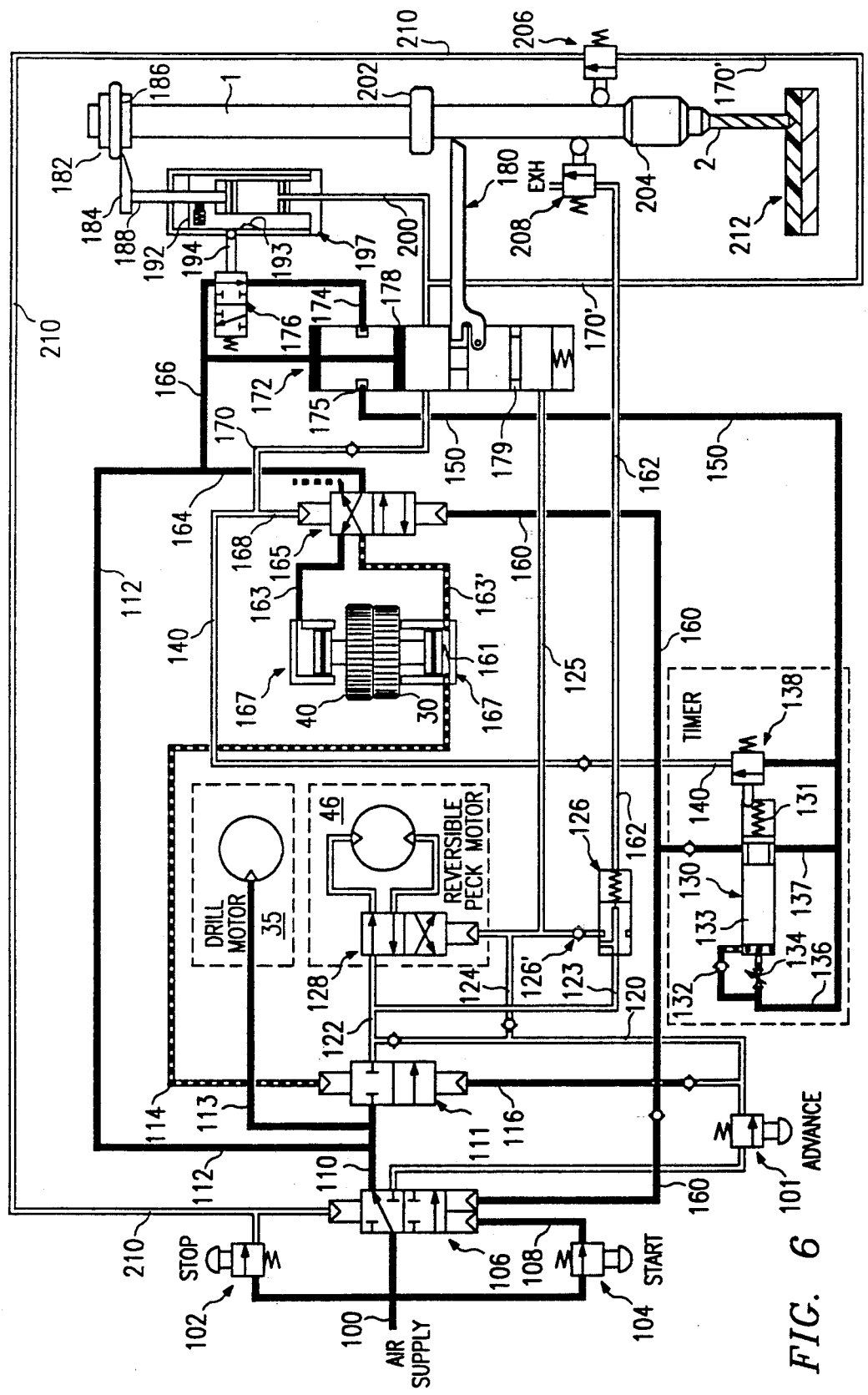
FIG. 6 is a pneumatic circuit schematic showing the state of the control system after the start button is pressed.

FIG. 6 shows the pressurized lines which result from pressing "start" button 104. Pressure flows through "start" button 104 and line 108 to bias master valve 106 so that sufficient volumes of air from inlet 100 may flow through lines 110 and 113 to run air motor 35. Pressure also flows through line 112 to line 166 where it passes through switch 176 (held open by compression of plunger 194 as discussed above), through line 174, around an annular passageway 175 in valve 172, and into line 150. Line 150 supplies pressure to timer 130 and restriction 134, thus beginning compression of spring 131 by timer piston 133.

Pressing "start" button 104 also supplies pressure to line 160 through line 108, and that pressure biases four-way valve 165 as shown in FIG. 6. When four-way valve 165 is biased as shown in FIG. 6, pressure from line 164 (supplied from line 112 and line 110) passes through four-way valve 165 and line 163 into cylinder 167 and compresses spring 161, thereby engaging differential feed gear 40 with differential rotation gear 30. Pressure also flows from line 160 into line 116 to bias two-way valve 111 to keep the pressure in line 110 from passing into line 122.

Since "advance" button 101 is no longer depressed, air is no longer able to flow through "advance" button 101 through line 120 into line 122. Since reverse actuating valve 126 is of a bleeder type, the pressure which had activated air motor 46 is released through the annular passageway in actuating valve 126 and check valve 126'; thus air motor 46 is not supplied with driving air pressure.

The state shown in FIG. 6, with differential feed gear 40 engaged with differential rotation gear 30 and air motor 46 exhausted, is the "drilling mode" discussed above. When in this mode, differential rotation gear 30 causes differential feed gear 40 to turn spindle feed gear 20 in the same rotational direction and faster than spindle rotation gear 10, thus causing spindle 1 to advance at the appropriate drilling rate. Thus, drill bit 2 advances into workpiece 212 as shown in FIG. 6, and it will continue to advance into workpiece 212 until spring 131 in timer 130 is compressed.

Compression of spring 131 activates switch 138 which had been closed to prevent pressure from line 150 from passing through switch 138 into line 140. As spring 131 is compressed, the pressure communicating from line 137 to line 160 is cut off by timer 130 as shown in FIG. 7.

At this point in the pecking cycle, "start" button 104 is not depressed, so pressure does not flow through line 108, through line 160, and into line 116 to bias two-way valve 111. Also, because line 160 is no longer being supplied with pressure from line 108, pressure is no longer supplied to bias four-way valve 165. The lack of pressure by itself does not cause valves 111 and 165 to shift, however, until switch 138 is opened. When switch 138 is open, pressure flows through line 140 to line 168, thus biasing four-way valve 165 and causing it to shift to the state shown in FIG. 7. In such a state, line 163 is exhausted and line 163' is pressurized.

Pressure from line 163' and spring 161 causes differential feed gear 40 to be shifted into a position which is disengaged from differential rotation gear 30, because pressure from line 163' flows through pneumatic cylinder 167 into line 114 and biases two-way valve 111 to shift to the state shown in FIG. 7. In this state, air is allowed to pass from line 110 through line 122 to drive air motor 46.

Unlike when air was supplied to line 122 from advance button 101, there is a sufficient volume of air passing through line 110 and two-way valve 111 to run the air motor 46 under a load. Pressure from line 122 also flows in line 123 into reverse actuating valve 126. The pressure in reverse actuating valve 126 flows through and pressurizes line 162. Pressure in line 162 biases the spool of reverse actuating valve 126 so that it remains in the position shown in FIG. 7, allowing any pressure remaining in line 125 to bleed through. Thus, air motor 46 runs in the forward direction, causing spindle feed gear 20 to turn in the direction opposite from the rotational direction of spindle rotation gear 10, and therefore spindle 1 retracts.

Now referring to FIGS. 8 and 8A, as spindle 1 is retracting, collar 182 disengages from arm 184. Because piston head 196 is no longer biasing sleeve 192, spring 198 pushes sleeve 192 upward, thus allowing plunger 194 and detent 193 to align and close switch 176.

Friction puck 190 (the holder in this preferred embodiment), which is preferably made from nylon frictionally engages the shaft 188. Friction puck 190 is mounted by a spring 191 to sleeve 192. Spring 191 biases friction puck 190 against shaft 188. As sleeve 192 is pushed upward by spring 198, spring 191 and friction puck 190 cause shaft 188 (and therefore piston head 196) to rise the same amount.

After sleeve 192 has traveled its full extent within housing 197, friction puck 190 holds shaft 184 and piston head 196 in place, thereby "remembering" the position of the spindle when the timer opened switch 138.

Piston head 196 rose slightly with sleeve 192; therefore, when the spindle is again advanced and contacts arm 184, the drill bit will still be a small distance away from the end of the hole. Piston head 196 and sleeve 192 travel downward as spindle 1 advances to cause plunger 194 to activate switch 176, thereby putting the drill in the drilling mode before drill bit 1 contacts the end of the hole once again.

Still referring to FIGS. 8 and 8A, collar 182 is shown disengaged from shaft 188, and plunger 194 is shown aligned with detent 193. Therefore, switch 176 no long allows pressure to communicate between line 166 and line 174. Line 174 is exhausted through switch 176 in this state and therefore timer 130 is exhausted through line 150, line 174 and switch 176. Switch 176 is actually three-way valve which in this preferred embodiment is constructed from a modified two-way valve. The two-way valve is modified by milling a bleed slot 380 in plunger 194 such that when plunger 194 is not pushed into switch 176, line 174 exhausts through switch 176 by plunger 194 (FIG. 15). Also, when plunger 194 is pushed into switch 176, line 174 is fed by line 166, and no bleeding by plunger 194 occurs, because at that point all of bleed slot 380 is within switch 176. Referring again to FIG. 8, spring 131 resets timer 130 for another cycle, and as timer 130 is reset, switch 138 closes.

As spindle 1 continues to retract from the workpiece, a spindle position indicator mounted on spindle 1 (here shown in the preferred embodiment as collar 204) is detected by the retracted position sensor (here shown in the preferred embodiment as switch 208). When switch 208 is contacted by collar 204, the pressure in line 162 bleeds off through switch 208. As pressure bleeds off from line 162, reverse actuating valve 126 changes state to that shown in FIG. 8. As pressure flows from line 123 through reverse actuating valve 126 and check valve 126' into reversing valve 128, air motor 46 reverses direction, thereby also reversing the direction of rotation of differential feed gear 40 and spindle feed gear 20.

While air motor 46 is running in the reverse direction, spindle 1 is advanced toward the workpiece. The relative speeds and directions of spindle feed gear 20 and spindle rotation gear 10 results in the advancement of spindle 1 at a speed greater than its rate of advancement during the drilling mode.

Spindle 1 continues to advance toward the workpiece until collar 182 contacts arm 184. At this point, piston head 196 begins to travel downward and carries sleeve 192 along through the frictional engagement between piston head 196 and sleeve 192 until spring 198 is compressed. Movement of sleeve 192 compresses plunger 194 into switch 176 as described above and pressure is again allowed through switch 176, again activating timer 130 (FIGS. 5 and 5A).

Pressure also flows through line 137 into line 160, thus shifting four-way valve 165 to allow pressure from line 164 to pass through four-way valve 165 into line 163, thereby biasing differential feed gear 40 to be engaged with differential rotation gear 30 again.

Shifting four-way valve 165 exhausts line 163' and line 114, thus causing pneumatic cylinder 167 to shift differential feed gear 40 into engagement with differential rotation gear 30 and allowing the pressure in line 160 to shift two-way valve 111 through line 116.

Shifting two-way valve 111 cuts off air flow from line 110 to line 122, thereby removing the air pressure to drive air motor 46. Air motor 46 exhausts through reverse actuating valve 128 (a four-way valve) and freely rotates, being driven by gears 40-45 (FIG. 1) as differential rotation gear 30 rotates. The drill is again in the drilling mode as shown in FIGS. 6 and 6A.

The pecking cycle shown in FIGS. 6-8 continues until a desired depth of the hole is reached. The desired depth is shown as a complete hole through workpiece 212 in FIG. 9 but can be a hole of desired depth which is less than the thickness of the workpiece. Referring now to FIG. 9, another position indicator (here shown in the preferred embodiment as collar 202) is positioned on the spindle such that it will be detected by the end of hole sensor (here shown in the preferred embodiment as retract valve 172) when the end of the hole is reached.

As spindle 1 is advancing in the drilling mode during one of the peck cycles, collar 202 contacts retract lever 180, thus causing retract valve 172 to shift. Shifting retract valve 172 isolates the pressure in line 174 from line 150, and timer 130 stops timing. Passage 178 in retract valve 172 lines up with line 170, allowing pressure to flow from line 166 through line 170 and into line 168, thus shifting four-way valve 165 and thereby causing differential feed gear 40 to disengage from differential rotation gear 30 as described above. At the same time, passage 179 lines up with line 125, exhausting line 125 so that if air motor 46 is running in the reverse direction when retract lever 180 is tripped (either manually or because the end of hole was reached just as the timer finished timing), reverse actuating valve 126 will cause air motor 46 to revert to a forward rotation.

Shifting four-way valve 165 allows pressure to flow from line 164 through line 163' causing pneumatic cylinder 167 to shift differential feed gear 40 to be disengaged from differential rotation gear 30 as discussed above. Shifting four-way valve 165 also applies pressure through line 114 to two-way valve 111, thereby supplying air pressure from line 110 to line 122 and turning on air motor 46. Air motor 46 turns differential feed gear 40 and spindle feed gear 20 to retract spindle 1.

When passage 178 (in retract valve 172) aligns with line 170, pressure also flows through line 170' and line 200 into sleeve 192 (see FIGS. 9A and 10). Therefore, as spindle 1 retracts, piston 196 retracts to its original position shown in FIG. 10, thus resetting the spindle position memory to be ready for drilling a new hole (FIG. 10A).

Now referring to FIG. 10, as spindle 1 retracts, spring 198 pushes sleeve 192 such that plunger 194 and detent 193 again align, thereby exhausting line 174 and isolating line 174 from line 166.

The pressurization of line 170' by passage 178 also initiates switch 206 (the job done sensor in this preferred embodiment). Switch 206 was contacted by collar 204 during retraction in the pecking cycles described above, but that contact had no effect, because switch 206 had not yet been initiated by pressurization of line 170' by passage 178. As spindle 1 retracts from the position shown in FIG. 9 to the position shown in FIG. 10, switch 206 is contacted, thus allowing pressure to flow through line 210.

As shown in FIG. 10, the pressure in line 210 causes master valve 106 to shift, thus preventing air flow from inlet 100 through lines 110 and 113, thereby stopping air motor 35. Shifting master valve 106 prevents air from flowing from inlet 100 through line 110 and two-way valve 111 to run air motor 46 (which had been running in the forward direction to cause differential feed gear 40 and spindle feed gear 20 to retract spindle 1). Pressure then bleeds from the system, returning the circuit to the state shown in FIG. 4. This completes the process of drilling a hole with the mechanical peck drill.

Referring now to FIG. 11, at any time during the operation of the drill, stop button 102 may be depressed allowing air flow from inlet 100 into line 210. This pressure will cause master valve 106 to shift to the position shown in FIG. 11, thus stopping air motor 35 and air motor 46. Pressure in the system bleeds, and the tool will remain in the position it was in when stop button 102 was depressed. Those elements which are spring biased will return to the positions shown in FIG. 11, however, other elements such as two-way valve 111 and four-way valve 165 will remain in the positions they were in when stop button 102 was depressed.

Now referring to FIG. 14, set screw 370 is provided for adjustment of the distance which sleeve 192 travels in housing 195. Sleeve 192 only has to travel a short distance before air passes through line 166 and switch 176 into line 174. Therefore, plunger 194 need not be pushed all the way into switch 176. By shortening the amount that sleeve 192 travels, the distance which the spindle must travel in the drilling mode when the drill bit is not in contact with the workpiece may be decreased. The closer set screw 370 is positioned to sleeve 192 when spring 198 is fully extended, the shorter the travel of sleeve 192. As long as sleeve 192 travels far enough to activate switch 176, there is no need for sleeve 192 to travel any further. Therefore, the rate of pecking may be increased by positioning set screw 370 close to sleeve 192.

In an alternative embodiment, sleeve 192 can be connected to a lever 300 (FIG. 12). Lever 300 is connected o a switch such that as sleeve 192 travels in housing 195, lever 300 changes position, thereby changing the state of switch 176.

In yet another embodiment, the holder is an O-ring 400, frictionally contacting piston shaft 188, and mounted in a fixed position relative to sleeve 192 (FIG. 13).

Other embodiments of the invention will occur to those skilled in the art without departing from the spirit of this invention.

What is claimed is:

1. Apparatus comprising:
   a spindle;
   a first gear, slidably mounted on said spindle, for rotating said spindle about the longitudinal axis of the spindle;
   a second gear, engaging said spindle, for reciprocating said spindle along its longitudinal axis;
   a third gear, engaging said first gear;
   a fourth gear, engaging said second gear, said fourth gear being shiftable between a first position wherein it is engaged with said third gear and a second position wherein it is disengaged from said third gear, said fourth gear being capable of turning about its axis of rotation when disengaged from said third gear thereby turning said second gear to reciprocate the spindle when said fourth gear is disengaged from said third gear; and
   a first drive train engaging said third gear to drive said third gear.

2. An apparatus in accordance with claim 1 further comprising:
   an indicator connected to said spindle; and
   a spindle position memory positioned to be contactable by said indicator, said spindle position memory registering movement of said indicator when said spindle is moving in a first direction, said spindle position memory storing the last position to which said indicator moved when said spindle was moving in said first direction.

3. An apparatus in accordance with claim 1 further comprising:
   an indicator connected to said spindle; and
   a spindle position memory contacting said indicator, said spindle position memory registering movement of said indicator when said spindle is moving in a first direction, said spindle position memory storing the last position to which said indicator moved when said spindle was moving in said first direction.

4. An apparatus in accordance with claim 3 wherein said spindle position memory further comprises:
   a housing;
   a sleeve slidably mounted in said housing;
   a resilient member contacting said housing and biasing said sleeve toward a first end of said housing;
   a piston slidably mounted in said sleeve; a shaft connected to said piston and extending through said housing; and
   a holder slidably contacting said shaft.

5. An apparatus in accordance with claim 4 wherein said spindle position memory further comprises:
   a switch, having at least two states, mounted to said housing;
   said switch being responsive to the sliding of said sleeve and changing states when said sleeve slides in said housing.

6. An apparatus in accordance with claim 4 wherein said holder is mounted to said sleeve.

7. An apparatus in accordance with claim 6 wherein said holder comprises:
   a friction puck, and means for biasing said friction puck into contact with said shaft.

8. An apparatus in accordance with claim 4 wherein said holder comprises:
   an o-ring mounted to said sleeve and contacting said shaft.

9. An apparatus in accordance with claim 4 wherein said resilient member is a spring.

10. An apparatus in accordance with claim 5 wherein said spindle position memory further comprises:
    a detent in said sleeve;
    a plunger mounted to said switch and engaging said detent, said switch changing to one state when said plunger moves toward said switch and changing to another state when said plunger moves away from said switch.

11. An apparatus in accordance with claim 6 wherein said spindle position memory further comprises:
    a lever pivotally connected to said switch and contacting said sleeve, said lever pivoting to a first position when said sleeve moves in a first direction, said lever pivoting to a second position when said sleeve moves in a second direction, said switch changing to one state when said lever pivots to said first position, said switch changing to another state when said lever moves to said second position.

12. An apparatus in accordance with claim 1 further comprising a second drive train engaging said fourth gear to drive said fourth gear.

13. Apparatus in accordance with claim 12, wherein said first drive train comprises a first motor for driving said third gear; and wherein said second drive train comprising a second motor for driving said fourth gear.

14. Apparatus in accordance with claim 1, wherein said second gear is a spindle feed gear which is threaded on said spindle for reciprocating said spindle along its longitudinal axis between an advance direction and a retract direction.

15. Apparatus in accordance with claim 1, further comprising a shifter, said shifter being connected to said fourth gear.

16. Apparatus in accordance with claim 15, wherein said second gear is a spindle feed gear which is threaded on said spindle for reciprocating said spindle along its longitudinal axis between an advance direction and a retract direction.

17. Apparatus in accordance with claim 16, wherein said first drive train comprises a first motor for driving said third gear.

18. Apparatus in accordance with claim 17, further comprising a second drive train having a second motor for driving said fourth gear.

19. Apparatus in accordance with claim 18, further comprising a tool mounted on said spindle.

20. Apparatus in accordance with claim 18, further comprising a drill bit mounted on said spindle.

21. Apparatus in accordance with claim 1, further comprising a tool mounted on said spindle.

22. Apparatus in accordance with claim 1, further comprising a drill bit mounted on said spindle.

23. An apparatus for reciprocating a tool in a workpiece comprising:
- a rotator connected to the tool to rotate the tool about the longitudinal axis of the tool, said rotator comprising a first gear, said first gear being slidably mounted to a spindle;
- a mechanical reciprocator connected to the tool for cyclically reciprocating the tool into the workpiece and at least partially withdrawing the tool from the workpiece for a plurality of cycles, said mechanical reciprocator comprising a second gear threaded to the spindle;
- a third gear connected to said first gear;
- a fourth gear connected to said second gear;
- a first drive train comprising a first motor connected to said third gear;
- a second drive train comprising a second motor connected to said fourth gear; and
- a shifter, said shifter being connected to said fourth gear.

24. An apparatus in accordance with claim 23 wherein said shifter has an engaged position and a disengaged position, said fourth gear being engaged with said third gear when said shifter is in the engaged position, and said fourth gear being disengaged from said third gear when said shifter is in the disengaged position.

25. A circuit for controlling the operation of an apparatus, the apparatus including:
- a spindle adapted to hold a drill bit, said spindle having connected thereto a first indicator, a second indicator, a third indicator, a spindle feed gear, and a spindle rotation gear, said spindle rotation gear being slidably mounted on said spindle, said spindle feed gear being threaded on said spindle and having an advance direction of rotation and a retract direction of rotation,
- a differential rotation gear engaging said spindle rotation gear,
- a differential feed gear engaging said spindle feed gear and said differential rotation gear when shifted into a drilling mode position,
- said differential feed gear engaging said spindle feed gear and being disengaged from said differential rotation gear when shifted into a non-drilling mode position,
- a rotation drive train engaging the differential feed gear; and
- a feed drive train engaging the differential feed gear when the differential feed gear is disengaged from the differential rotation gear;

said circuit comprising:
- a drilling mode sensor which generates a drilling mode signal when contacted by the first indicator on the spindle;
- a shifter which moves the differential feed gear into and out from engagement with the differential rotation gear, said shifter, in response to said drilling mode signal, engaging the differential feed gear with the differential rotation gear and disengaging the differential feed gear from the feed drive train;
- a timer, started in response to said drilling mode signal, said timer generating a time signal at the end of a predetermined time,
- the shifter, in response to said time signal, disengaging the differential feed gear from the differential rotation gear and engaging the differential feed gear with the feed drive train,
- the feed drive train, in response to said time signal, turning the differential feed gear in the retract direction,
- a retracted position sensor which generates a retracted signal when contacted by the second indicator on the spindle,
- the feed drive train, in response to said retracted signal, reversing the direction of the differential feed gear and turning the differential feed gear in the advance direction until said drilling mode sensor is contacted by the first indicator on the spindle;
- an end of hole sensor which generates an end of hole signal when contacted by the third indicator on the spindle,
- the shifter, in response to said end of hole signal, disengaging the differential feed gear from the differential rotation gear and engaging the differential feed gear with the feed drive train,
- the feed drive train, in response to said end of hole signal, turning the differential feed gear in the retract direction,
- a job done sensor which generates a job done signal when sensing said end of hole signal and being contacted by the third indicator on the spindle,
- the rotation drive train stopping in response to said job done signal, and
- the feed drive train stopping in response to said job done signal.

* * * * *

UNITED STATES PATENT AND TRADEMARK OFFICE
CERTIFICATE OF CORRECTION

PATENT NO. : 5,149,232
DATED : September 22, 1992
INVENTOR(S) : Richard E. Eckman It is certified that error appears in the above-identified patent and that said Letters Patent is hereby corrected as shown below:

Column 1, line 14, change "bit In" to --bit. In--.

Column 2, line 25, change "a tool" to --a tool including:--.

Column 2, line 36, change "the invention" to --the invention includes:--

Column 4, line 37, change "DESCRIPTION DRAWINGS" to --DESCRIPTION OF THE DRAWINGS--.

Column 4, line 39, change "and dr of" to --and drive train of--.

Column 4, line 43, change "invention differential" to --invention showing a differential--.

Column 4, line 46, change "preferred of" to --preferred embodiment of--.

Column 4, line 51, change "the control" to --the preferred control--.

Column 4, lines 51-52, change "of to" to --of a spindle to--.

Column 4, line 54, change "memory the" to --memory of the--.

UNITED STATES PATENT AND TRADEMARK OFFICE
CERTIFICATE OF CORRECTION

PATENT NO. : 5,149,232
DATED : September 22, 1992
INVENTOR(S) : Richard E. Eckman It is certified that error appears in the above-identified patent and that said Letters Patent is hereby corrected as shown below:

Column 4, line 57, change "the control" to --the preferred control--.

Column 4, line 59, change "6A sectional" to --6A is a sectional--.

Column 4, line 64, change "timing retraction" to --timing and retraction--.

Column 4, line 66, change "memory the" to --memory of the--.

Column 5, line 6, change "end hole" to --end of the hole--.

Column 5, line 14, change "the control" to --the preferred control--.

Column 5, line 16, change "10 sectional" to --10A is a sectional--.

Column 5, line 17, change "preferred during" to --preferred embodiment during--.

Column 5, line 17-18, change "end has" to --end of the hole has--.

Column 5, line 20, change "the control" to --the preferred control--.

UNITED STATES PATENT AND TRADEMARK OFFICE
CERTIFICATE OF CORRECTION

PATENT NO. : 5,149,232
DATED : September 22, 1992
INVENTOR(S) : Richard E. Eckman It is certified that error appears in the above-identified patent and that said Letters Patent is hereby corrected as shown below:

Column 12, line 6, change "valve !11" to --valve 111--.

Column 13, line 5, change "o a" to "to a".

Signed and Sealed this

Fifteenth Day of March, 1994

Attest:

BRUCE LEHMAN

Attesting Officer

Commissioner of Patents and Trademarks